United States Patent
Dalziel et al.

(10) Patent No.: US 7,163,708 B2
(45) Date of Patent: Jan. 16, 2007

(54) PROCESS FOR DRY COATING A FOOD PARTICLE OR ENCAPSULATING A FROZEN LIQUID PARTICLE

(75) Inventors: Sean M. Dalziel, Wilmington, DE (US); Thomas E. Friedmann, Hockessin, DE (US); George A. Schurr, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 250 days.

(21) Appl. No.: 10/174,687

(22) Filed: Jun. 19, 2002

(65) Prior Publication Data
US 2003/0031768 A1   Feb. 13, 2003

Related U.S. Application Data

(60) Provisional application No. 60/299,206, filed on Jun. 19, 2001.

(51) Int. Cl.
*A23B 9/14* (2006.01)
*A23P 1/08* (2006.01)

(52) U.S. Cl. ............... 426/302; 426/303; 426/304; 426/310

(58) Field of Classification Search ............ 426/98, 426/302, 303, 304, 310
See application file for complete search history.

(56) References Cited

U.S. PATENT DOCUMENTS

| | | |
|---|---|---|
| 3,949,094 A | 4/1976 | Johnson et al. |
| 4,075,356 A | 2/1978 | Haag et al. |
| 4,439,211 A | 3/1984 | Anderson et al. |
| 4,848,673 A | 7/1989 | Masuda et al. |
| 5,198,225 A | 3/1993 | Meybeck et al. |
| 5,453,383 A | 9/1995 | Roufs et al. |
| 5,547,683 A | 8/1996 | Yano et al. |
| 5,603,952 A | 2/1997 | Soper |
| 5,645,878 A | 7/1997 | Breslin et al. |
| 5,800,923 A | 9/1998 | Amey et al. |
| 6,015,773 A | 1/2000 | Wysong et al. |
| 6,248,378 B1 | 6/2001 | Ganan-Calvo |
| 6,312,521 B1 * | 11/2001 | Lee et al. ............ 118/303 |

FOREIGN PATENT DOCUMENTS

| | | |
|---|---|---|
| WO | WO 97/07676 A1 | 3/1997 |
| WO | WO 97/07879 A1 | 3/1997 |

OTHER PUBLICATIONS

M. A. Augustin et al., Microencapsulation for Innovative Ingredients, Food Science Australia, pp. 1-51, May 2001.
U.S. Appl. No. 10/476,199, filed Jun. 19, 2002, Schurr et al.

* cited by examiner

Primary Examiner—N. Bhat (57) ABSTRACT

A process for dry coating a food particle having a size in the range from about 0.5 mm to about 20.0 mm is disclosed. The resulting coated food particle has a moisture level that is substantially the same as the moisture level of the uncoated food particle. A process for encapsulating a frozen liquid particle having a size in the range from 5 micrometers to 5 millimeters with a liquid coating material is also disclosed. Also disclosed are coated food particles and encapsulate frozen liquid particles made by one of the processes of the invention.

10 Claims, 2 Drawing Sheets

PROCESS FOR DRY COATING A FOOD PARTICLE OR ENCAPSULATING A FROZEN LIQUID PARTICLE

This application claims the priority benefit of U.S. Provisional Application No. 60/299,206, filed Jun. 19, 2001, the disclosure of which is hereby incorporated by reference in its entirety.

FIELD OF THE INVENTION

A process for dry coating a food particle having its largest diameter in the range from 0.5 mm to 20.0 mm with a liquid coating material is disclosed. The coated food particle has a moisture level that is substantially the same as the moisture level of the uncoated food particle. Also disclosed is a process for encapsulating a frozen liquid particle having a size in the range from 5 micrometers to 5 millimeters with a liquid coating material.

TECHNICAL BACKGROUND

A considerable number of food products are sold with surface coatings to enhance the value of the product. Examples of such coated food products include, but are not limited to, snack foods, cereal food products, food flavorings, and many other segments in the food chain. Many of these products are produced by coating a food substrate such as a cereal product with sweeteners, flavorings or other additives that enhance the product.

Typically, the material to be coated is first immersed or dispersed in a liquid to achieve coating, thus creating difficult solids recovery problems and generating large waste streams. In addition, the coated product usually has a higher moisture level than the uncoated product. Thus, the coated particle must be separated from the liquid and subsequently dried in order to recover the particles.

An apparatus and process for coating small solid particles, such as powdery or granular materials, are described in WO 97/07879 published Mar. 6, 1997 and assigned to E. I. du Pont de Nemours and Company. This process involves metering a liquid composition comprising a coating material, where the liquid composition is either a solution, slurry or melt, into a flow restrictor and injecting a gas stream through the flow restrictor concurrently with the metering of the liquid composition to create a zone of turbulence at the outlet of the flow restrictor, thereby atomizing the liquid composition. The gas stream is heated prior to injecting it through the flow restrictor. A solid particle is added to the zone of turbulence concurrently with the metering of the liquid composition and the injection of the heated gas to mix the solid particle with the atomized liquid composition. The mixing at the zone of turbulence coats the solid particle with the coating material.

WO 97/07676 to E. I. du Pont de Nemours and Company discloses the apparatus of WO 97/07879, along with the use of the apparatus in a process for coating crop protection solid particles. Coatings are water-insoluble, and coating thicknesses are represented by percent rather than thickness.

U.S. Pat. No. 6,015,773, issued to Wysong et al. on Jan. 18, 2000, describes a crop protection composition comprising a mononucleate crop protection solid particle coated with water-insoluble coating material having a diameter in the range from 0.5 to 50 micrometers. This composition is made by a process which results in substantial non-agglomeration of the coated particles.

SUMMARY OF THE INVENTION

The present invention concerns a process for dry coating a food particle, having a size in the range from 0.5 mm to 20.0 mm, with a liquid coating material, the process comprising the steps of:
(a) metering a liquid coating material into a flow restrictor;
(b) injecting a gas stream through the flow restrictor concurrently with step (a) to create a zone of turbulence at the outlet of the flow restrictor, thereby atomizing the liquid coating material, wherein the gas stream is optionally heated; and
(c) adding a food particle to the zone of turbulence concurrently with steps (a) and (b) to mix the food particle with the atomized liquid coating material, wherein the mixing at the zone of turbulence coats the food particle with the liquid coating material wherein moisture level of the coated food particle is substantially the same as the moisture level of the uncoated food particle.

In a second embodiment, this process of the invention further comprises repeating steps (a)–(c) at least once wherein the liquid coating material is the same or different.

The process of the invention can be used to coat food particles having a size in the range from 0.5 mm to 20.0 mm such as a cereal food product, a snack food product, a baked good product, a fried food product, an extruded food product, a health food product, a pet food product, or animal feed.

This invention also can be practiced using liquid coating materials which comprise a sweetening agent, a food flavoring agent or enhancer, a food color, a protein, a food aroma agent, an anti-caking agent, an humectant, an anti-microbial agent, an antioxidant, a surface modifying agent, a nutritional supplementing agent, a carbohydrate, a lipid, or a mineral.

In still another embodiment, this invention concerns a process for encapsulating a frozen liquid particle, having a size in the range from 5 micrometers to 5 millimeters with a liquid encapsulating material, the process comprising the steps of:
(a) metering a liquid encapsulating material into a flow restrictor;
(b) injecting a gas stream through the flow restrictor concurrently with step (a) to create a zone of turbulence at the outlet of the flow restrictor, thereby atomizing the liquid encapsulating material, wherein the gas stream is optionally heated; and
(c) adding a frozen liquid particle to the zone of turbulence concurrently with steps (a) and (b) to mix the frozen liquid particle with the atomized liquid encapsulating material, wherein the mixing at the zone of turbulence encapsulates the frozen liquid particle.

The frozen liquid particle comprises an aqueous or nonaqueous solution, a pure material, an emulsion or a slurry.

The liquid encapsulation material comprises a sweetening agent, a food flavoring agent or enhancer, a food color, a food aroma agent, an anti-caking agent, an humectant, an antimicrobial agent, an antioxidant, a surface modifying agent, a moisture barrier, a shelf-life extending agent, a flavor retaining agent, a protein, a nutritional supplementing agent, a carbohydrate, a lipid, a polymer, or a mineral.

Also of interest is a coated food particle or an encapsulated particle made by at least one of the processes of the invention.

DETAILED DESCRIPTION OF THE INVENTION

All patents, patent applications and publications referred to herein are incorporated by reference in their entirety.

In the context of this disclosure, a number of terms shall be utilized.

The term "coating" as used herein refers to covering a particle with a layer of a coating material. The covering is not necessarily uniform nor is the entire surface necessarily covered. The term "dry coating" as used herein refers to a coating process wherein the particle to be coated is coated in its dry form, the process does not require dispersing the particles in a continuous liquid phase prior to coating, and at conclusion of the process the particle has no substantial gain in moisture relative to its uncoated form. The terms "coating" and "dry coating" are used interchangeably herein.

The term "encapsulating" as used herein refers to a process for completely coating a solid particle so that the coating will encase the particle under conditions when the particle is in either liquid or solid form at temperatures below the melting or degradation temperature of the coating or encapsulating material, and wherein the coating remains distinct from the liquid that it encases.

The term "moisture level" as used herein refers to the amount of moisture, for example water or solvent, that is present in the food particle before or after coating.

The term "size" as used herein refers to the longest diameter or longest axis of the particle being coated or encapsulated.

The present invention concerns a process for dry coating a food particle, having a size in the range from 0.5 mm to 20.0 mm, with a liquid coating material, the process comprising the steps of:
  (a) metering a liquid coating material into a flow restrictor;
  (b) injecting a gas stream through the flow restrictor concurrently with step (a) to create a zone of turbulence at the outlet of the flow restrictor, thereby atomizing the liquid coating material, wherein the gas stream is optionally heated; and
  (c) adding a food particle to the zone of turbulence concurrently with steps (a) and (b) to mix the food particle with the atomized liquid coating material, wherein the mixing at the zone of turbulence coats the food particle with the liquid coating material wherein moisture level of the coated food particle is substantially the same as the moisture level of the uncoated food particle.

In another aspect, the above-described process further comprises repeating steps (a)–(c) at least once wherein the liquid coating material is the same or different. Thus, food particles, for example, can be dry coated with a combination of liquid coating materials such as sucrose and fat, gelatin and fat, gelatin and sucrose, wax and sucrose, fat and other sweeteners, fat and salts, and other flavorings, etc., thus enabling unique combinations of flavors, colors, aromas, etc., to be coated onto the particles. Multiple coatings thus applied can lead to uniquely tailored food particles with desired colors, flavorings and freshness aspects; each coating having the ability to retain its original integrity and function, in that there is minimal "mixing" of subsequent layers which are applied to the dry food particles.

Additionally, food particles can be further coated multiple times with the same liquid coating material, enabling the claimed process to yield food particles having particularly-controlled thickness of the coating material. Food particles that are coated multiple times with the same liquid coating material can be coated in a continuous process, or a batch-wise process. It is also possible to provide multiple coatings to a food particle by delivering the output of a first apparatus to the feed of a second apparatus in a continuous process.

There are several benefits of the instant process. Applicants believe the process of the instant invention is more cost efficient than currently-conducted food coating processes, which commonly depend upon spray drying techniques. Further, in one particularly important aspect, the instant process has the flexibility to be operated as a continuous process, or as a batch process with easily modified batch volumes and batch time periods. Further, overall food quality appears to be improved since this is a dry coating process, wherein the liquid coating and drying step occur during the same pass of the food particle through the apparatus of the invention. Thus, there is reduced time of liquid residence on the particle, resulting in reduced opportunity for microbial contamination. Overall food quality is also improved in that food particles that have been coated with the instant process have been observed to retain their morphology, structural integrity and particle size throughout the process. And importantly, the starting moisture level of the coated food particle is substantially unchanged during the process. In other words, the moisture level of the uncoated food particle will be substantially the same as the moisture level of the coated food particle. It is desirable that the process yields final coated particles that have not lost moisture and appear too dry, or have taken on additional moisture and become damp, soggy or agglomerated.

The flexibility which is inherent in the operation of the apparatus and process of the invention can result in production of high quality coated food particles, having carefully-controlled and unique characteristics. For example, concentration values of the coating liquid, flow rates of the solid particle feed and the liquid coating feed, ratios of liquid feeds to solid feeds, and temperature and velocity of the gas streams can all be easily varied to yield coated food particles with particular desired characteristics.

Any food particle having a size in the range from 0.5 mm to 20.0 mm can be dry coated using the process of the invention. Examples of such particles include, but are not limited to, a cereal food product, a snack food product, a baked good product, a fried food product, a health food product, a pet food product, or animal feed.

A cereal food product is a food product derived from the processing of a cereal grain. A cereal grain includes any plant from the grass family that yields an edible grain (seed). The most popular grains are barley, corn, millet, oats, quinoa, rice, rye, sorghum, triticale, wheat and wild rice. Examples of a cereal food product include, but are not limited to, whole grain, crushed grain, grits, flour, bran, germ, breakfast cereals, extruded foods, pastas, and the like.

A baked good product comprises any of the cereal food products mentioned above and has been baked or processed in a manner comparable to baking, i.e., to dry or harden by subjecting to heat. Examples of a baked good product include, but are not limited to bread crumbs, baked snacks, mini-biscuits, mini-crackers, mini-cookies, and mini-pretzels.

A snack food product comprises any of the above or below described food products.

A fried food product comprises any of the above or below described food products which has been fried.

A health food product is any food product that imparts a health benefit. Many oilseed-derived food products may be considered as health foods. There can be mentioned soybeans, flax seed, sesame seed, pumpkin seeds, sunflower seeds, or food products processed from these seeds or which are incorporated into foods. For example, soy nuggets and soy nuts can be mentioned. In addition to oilseed-derived food products, fruit-derived food products can be mentioned such as fruit bits, dried berries, and the like.

A pet food product is a product intended to be fed to a pet such as a dog, cat, bird, reptile, fish, rodent and the like. These products can include the cereal and health food products above, as well as meat and meat byproducts, grass and hay products, including but not limited to alfalfa, timothy, oat or brome grass and the like.

Animal feed is a product intended to be fed to animals such as turkeys, chickens, cattle and swine and the like. As with the pet foods above, these products can include cereal and health food products, meat and meat byproducts, and grass and hay products as listed above.

Suitable liquid coating materials which can be used to dry coat a food particle will depend upon the intended application. For example, if the food particle is intended for human consumption then the liquid coating material should be generally recognized as safe ("GRAS"). If the food particle is intended for incorporation into a pet food or animal feed, then other liquid coatings may be suitable.

Examples of GRAS coating materials include, but are not limited to, solutions of sweetening agents such as sucrose or maltodextrose, solutions of proteins such as zein, casein, gelatin, soy protein, whey proteins, solutions of fats such as hydrogenated soybean oil, or solutions of an inorganic material such as sodium chloride, or slurries of materials such as titanium dioxide in water.

Other liquid coating materials which can be used in the process of the invention can comprise a sweetening agent, a food flavoring agent or enhancer, a food color, a food aroma agent, an anti-caking agent, an humectant, an antimicrobial agent, an antioxidant, a surface modifying agent, a nutritional supplementing agent, a protein, a carbohydrate, a lipid or a mineral.

Examples of sweetening agents include, but are not limited to, sugar substitutes such as saccharin, cyclamate, monellin, thaumatins, curculin, miraculin, stevioside, phyllodulcin, glycyrrhizin, nitroanilines, dihydrochalcones, dulcin, suosan, guanidines, oximes, oxathiazinone dioxides, aspartame, alitame, and the like. There can also be mentioned monosaccharides and oligosaccharides. Examples of monosaccharides include, but are not limited to, galactose, fructose, glucose, sorbose, agatose, tagatose and xylose. As oligosaccharides there can be mentioned, sucrose, lactose, lactulose, maltose, isomaltose, maltulose, saccharose and trehalose. Other sweetening agents that can also be used include, but are not limited to, high fructose corn syrup.

Examples of food flavoring agents or enhancers include, but are not limited to, monosodium glutamate, maltol, 5'-mononucleotides, such as inosine, and the like.

Examples of food colors include, but are not limited to, tartrazine, riboflavin, curcumin, zeaxanthin, β-carotene, bixin, lycopene, canthaxanthin, astaxanthin, β-apo-8'-carotenal, carmoisine, amaranth, Ponceau 4R (E124), Carmine (E120), anthocyanidin, erythrosine, Red 2G, Indigo Carmine (E132), Patent Blue V (E131), Brilliant blue, chlorophyll, chlorophyllin copper complex, Green S (E142), Black BN (E151), and the like.

Examples of food aroma agents include, but are not limited to, carbonyl compounds, pyranones, furanones, thiols, thioethers, di- and trisulfides, thiophenes, thiazoles, pyrroles, pyridines, pyrazines, phenols, alcohols, hydrocarbons, esters, lactones, terpenes, volatile sulfur compounds and the like.

Examples of an anti-caking agents include, but are not limited to, sodium, potassium, calcium hexacyanoferrate (ll), calcium silicate, magnesium silicate, tricalcium phosphate, magnesium carbonate and the like.

Examples of humectants include, but are not limited to, 1,2-propanediol, glycerol, manitol, sorbitol and the like.

Examples of antimicrobial agents include, but are not limited to, benzoic acid, PHB esters, sorbic acid, propionic acid, acetic acid, sodium sulfite and sodium metabisulfite, diethyl pyrocarbonate, ethylene oxide, propylene oxide, nitrite, nitrate, antibiotics, diphenyl, o-phenylphenol, thiabendazole and the like.

Examples of antioxidant agents include, but are not limited to, tocopherols, 2,6-di-tert-butyl-p-cresol (BHT), tert-butyl-4-hydroxyanisole (BHA), propylgallate, octylgallate, dodecylgallate, ethoxyquin, ascorbyl palmitate, ascorbic acid and the like.

Examples of surface modifying agents include, but are not limited to, mono-, diaglycerides and derivatives, sugar esters, sorbitan fatty acid esters, polyoxyethylene sorbitan esters, stearyl-2-lactylate and the like.

Examples of nutritional supplementing agents include, but are not limited to, vitamins group consisting of fat soluble vitamins group consisting of retinol (vit A), calciferol (vit D), tocopherol (vit E), phytomenadione (vit K1), water soluble vitamins group consisting of thiamine (vit B1), riboflavin (vit B2), pyridoxine (vit B6), nicotinamide (niacin), pantothenic acid, biotin, folic acid, cyanocobalamin (vit B12), ascorbic acid (vit C), polyunsaturated fatty acids (PUFA), and the like.

Other carbohydrates which can be used in a liquid coating material include polysaccharides such as agar, alginates, carrageenans, furcellaran, gum arabic, gum ghatti, gum tragacanth, karaya gum, guaran gum, locust bean gum, tamarind flour, arabinogalactan, pectin, starch, modified starches, dextrins, cellulose, cellulose derivatives, hemicelluloses, xanthan gum, scleroglucan, dextran, polyvinyl pyrolidone and the like.

Examples of lipids include, but are not limited to, saturated and unsaturated fatty acids, mono- and diacylglycerols triacylglycerols, phospholipids, glycolipids, phosphatidyl derivatives, glycerolglycolipids, sphingolipids, lipoproteins, diol lipids, waxes, cutin and the like.

Examples of minerals include, but are not limited to, salts of sodium, potassium, magnesium, calcium, chloride, phosphate, iron, copper, zinc, manganese, cobalt, vanadium, chromium, selenium, molybdenum, nickel, boron, silica, silicon, fluorine, iodine, arsenic and the like.

Any of the liquid coating materials discussed herein can be used to encapsulate a frozen liquid particle. In addition, there can be mentioned a shelf-life extending agent such as an oxygen barrier and a flavor retaining agent such as a volatile barrier.

In another aspect, this invention concerns any coated food particle made using the process of this invention.

The apparatus used to practice the process of this invention is generally as described in commonly-owned PCT application WO 97/07879 which is discussed above. An apparatus according to the present invention is shown generally at 10 in FIG. 1.

Figure 1:
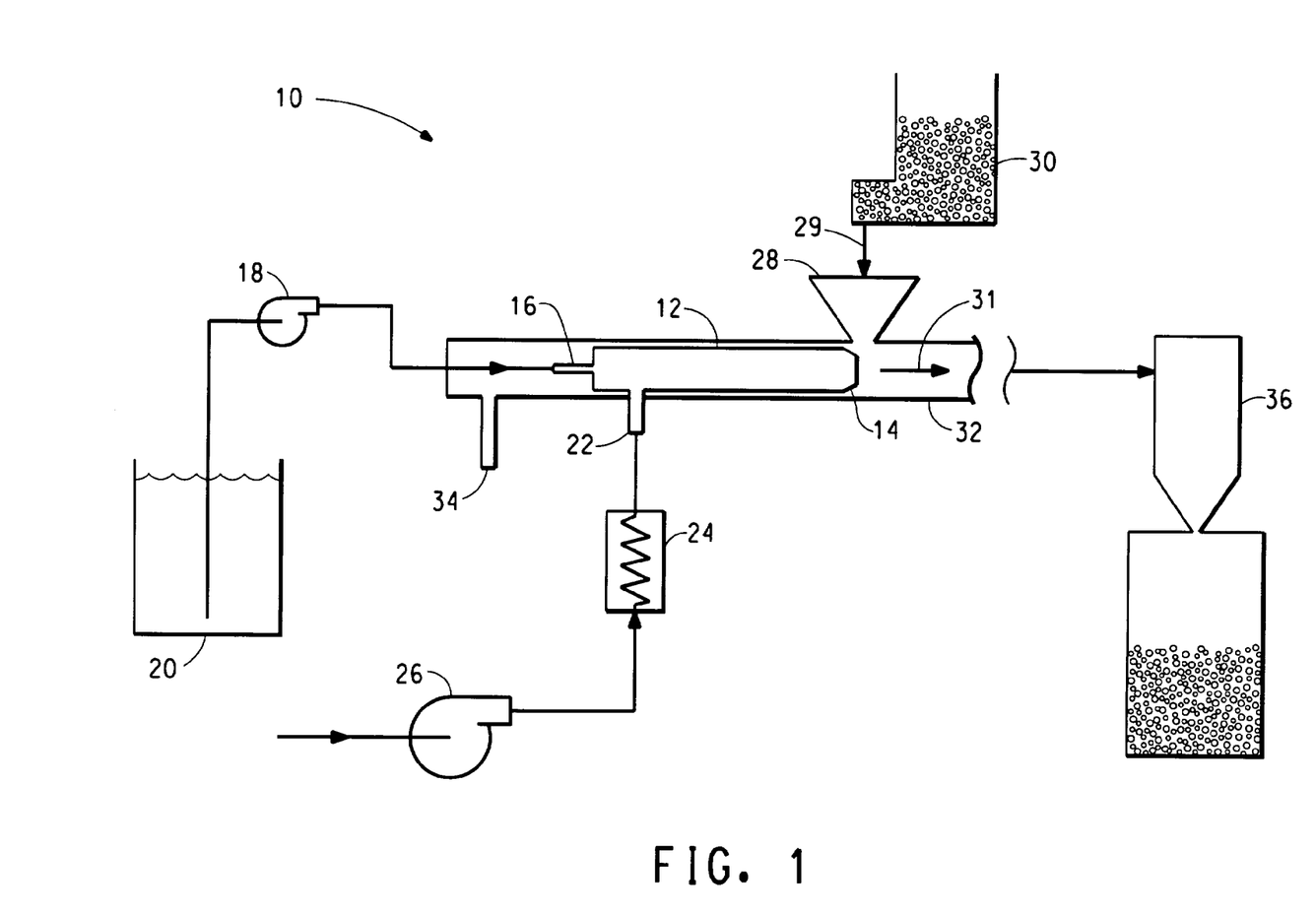
FIG. 1 is a schematic diagram of a portion of the apparatus in accordance with the present invention.
Figures 2, 3:
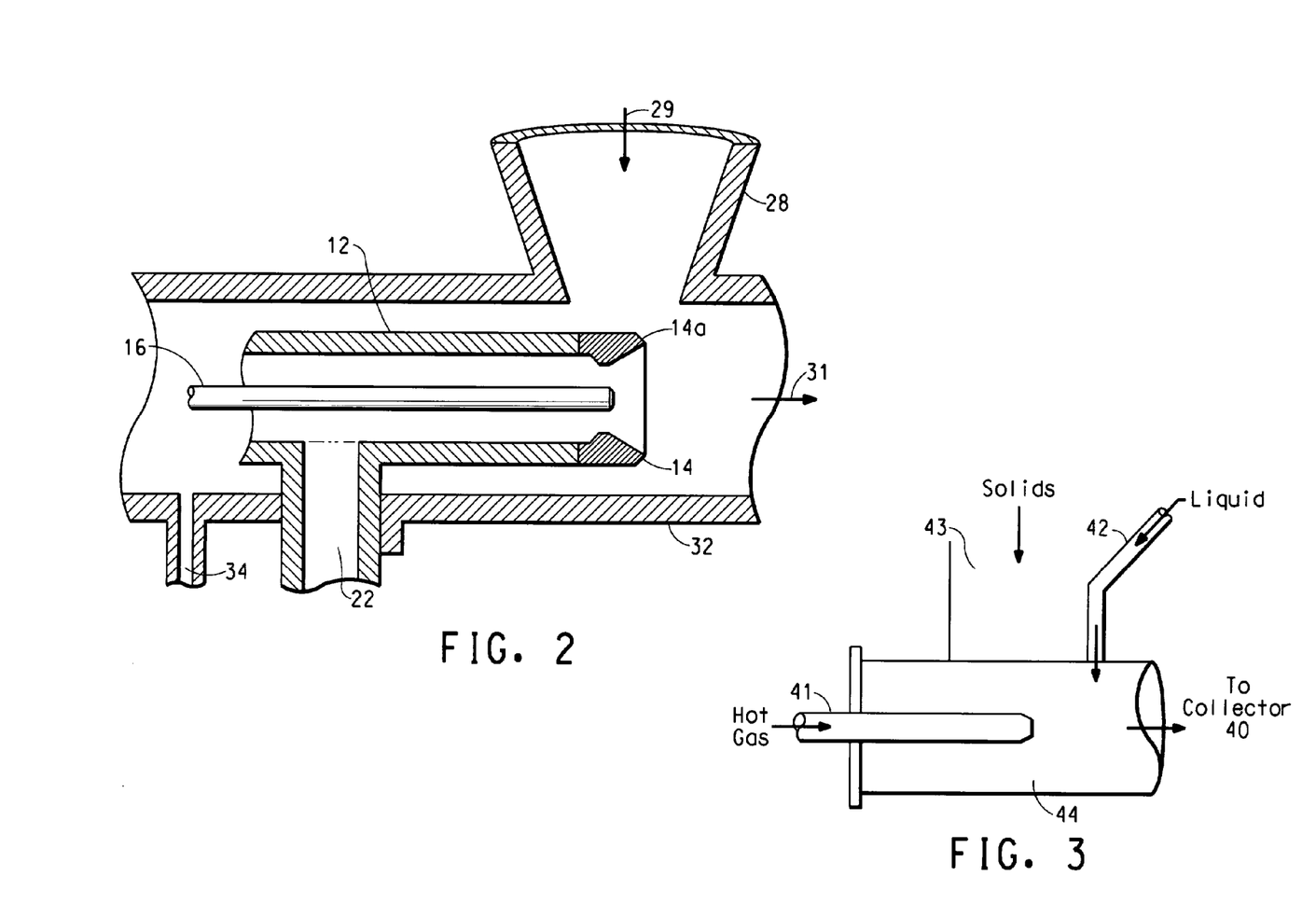
FIG. 2 is a cut-away, expanded, cross-sectional view of a portion of the apparatus shown in FIG. 1.
FIG. 3 is an alternative schematic diagram of the apparatus in FIGS. 1 and 2, wherein the solid and liquid are inserted on the top side of the structure and heated air is injected through a nozzle on one side.

The apparatus of the present invention comprises a first chamber, shown at 12 in FIGS. 1 and 2. A flow restrictor 14 is disposed at one end of the first chamber. The flow restrictor is typically disposed at the downstream end of the first chamber, as shown in FIGS. 1 and 2. Flow restrictor 14 has an outlet end 14a, as shown in the detailed view of FIG. 2. Although the flow restrictor is shown as a different element from the first chamber, it may be formed integrally therewith, if desired. The flow restrictor of the present invention may have various configurations, as long as it serves to restrict flow and thereby increase the pressure of the fluid passing through it. Typically, the flow restrictor of the present invention is a nozzle.

A first, or liquid, inlet line 16 as shown in FIGS. 1 and 2 is disposed in fluid communication with the first chamber for metering a liquid composition into the chamber. Liquid inlet line 16 meters the liquid composition into first chamber 12 in the outlet of flow restrictor 14, and preferably in the center of the flow restrictor when viewed along the axial length thereof. The liquid composition is metered through liquid inlet line 16 by a metering pump 18 from a storage container 20 containing the liquid composition as shown in FIG. 1.

The liquid composition may be a solution, where a material which is used as the coating material is dissolved in a liquid, or a slurry, or an emulsion where a material which is used as the coating material is undissolved in a liquid. Alternatively, the liquid composition may be a melt, which is used as the coating material. By melt is meant any substance at a temperature at or above it melting point, but below its boiling point. In any of these cases, the liquid composition may include components other than the coating material. It should be noted that when the liquid composition is a melt, storage container 20 must be heated to a temperature above the melt temperature of the liquid composition in order to maintain the liquid composition in melt form.

The apparatus for coating a particle further includes a second, or gas, inlet line 22 disposed in fluid communication with the first chamber as shown in FIGS. 1 and 2. Generally, the gas inlet line should be disposed in fluid communication with the first chamber upstream of the flow restrictor. Gas inlet line 22 injects a first gas stream through the flow restrictor to create a zone of turbulence at the outlet of the flow restrictor. The turbulence subjects the liquid composition to shear forces that atomize the liquid composition.

The first gas stream should have a stagnation pressure sufficient to accelerate the gas to at least one-half the velocity of sound, or greater, prior to entering the flow restrictor to ensure that a zone of turbulence of sufficient intensity will be formed at the outlet of the flow restrictor. The velocity of sound for a particular gas stream, e.g., air or nitrogen, will be dependent on the temperature of the gas stream. This is expressed by the equation for the speed of sound, C:

$$C=\sqrt{kgRT}$$

where:

k=ratio of specific heats for the gas g=acceleration of gravity

R=universal gas constant

T=absolute temperature of the gas

Thus, the acceleration of the first gas stream is dependent on the temperature of the gas stream.

As noted above, it is the pressurized gas that causes the atomization of the liquid composition. The pressure of the liquid composition in the liquid inlet line just needs to be enough to overcome the system pressure of the gas stream. It is preferable that the liquid inlet line has an extended axial length before the zone of turbulence. If the liquid inlet line is too short, the flow restrictor becomes plugged.

The apparatus of the present invention also comprises means disposed in the second inlet line and upstream of the flow restrictor for optionally heating the first gas stream prior to injection through the flow restrictor. Preferably, the heating means comprises a heater 24 as shown in FIG. 1. Alternatively, the heating means may comprise a heat exchanger, a resistance heater, an electric heater, or any type of heating device. Heater 24 is disposed in second inlet line 22. A pump 26 as shown in FIG. 1 conveys the first gas stream through heater 24 and into first chamber 12. When a melt is used as the coating material, the gas stream should be heated to a temperature at or above the melt temperature of the melt, to keep the melt in liquid (i.e., melt) form. When using a melt, it is also helpful if auxiliary heat is provided to the first inlet line which supplies the melt prior to injection, to prevent pluggage of the line.

The apparatus of the present invention further includes a hopper 28 as shown in FIGS. 1 and 2. Hopper 28 introduces a particle to the zone of turbulence. It is preferable that the outlet end of the flow restrictor is positioned in the first chamber beneath the hopper at the center line of the hopper. This serves to ensure that the particles are introduced directly into the zone of turbulence. This is important because, as noted above, the turbulence subjects the liquid composition to shear forces that atomize the liquid composition. It also increases operability by providing a configuration for feeding the particles most easily. In addition, the shear forces disperse and mix the atomized liquid composition with the particles, which allows the particles to be coated. Hopper 28 may be fed directly from a storage container 30 as shown by arrow 29 in FIG. 1. The hopper of the present invention may include a metering device for accurately metering the particles at a particular ratio to the liquid feed from liquid inlet line 16 into the zone of turbulence. This metering establishes the level of coating on the particle. Typically, the hopper of the present invention is open to the atmosphere. When a melt is used, it is preferred that the particles are at ambient temperature because this facilitates solidification of the melt after the melt which is initially at a higher temperature, coats the particle in the zone of turbulence.

The apparatus of the present invention may further include a second chamber 32 surrounding the first chamber as shown in FIGS. 1 and 2. In addition, the second chamber encloses the zone of turbulence. Second chamber 32 has an inlet 34 for introducing a second gas stream into the second chamber. The inlet of the second chamber is preferably positioned at or near the upstream end of second chamber 32. The outlet of second chamber 32 is connected to a collection container, such as that shown at 36 in FIG. 1. The second gas stream cools and conveys the coated particles toward the collection container as illustrated by arrow 31 in FIG. 2. In particular, when a solution or slurry is used, the solid of the solution or slurry cools between the zone of turbulence and container so that by the time the particle reaches the container, a solid coating comprising the solid of the solution or slurry is formed on the particle. When a melt is used, the liquid composition cools between the zone of turbulence so that by the time the particle reaches the container, a solid coating comprising the melt is formed on the particle. The first gas stream, as well as the second gas stream, are vented through the top of collection container 36.

For the configuration as shown in FIGS. 1 and 2, inlet 34 may be connected to a blower, not shown, which supplies the second gas stream to the second chamber. However, the blower and second chamber 32 may be eliminated, and the first gas stream may be used to cool the particles and to convey them to container 36. In this case, the solid from the solution or slurry or the melt cools and solidifies on the particle in the atmosphere between the zone of turbulence and the collection container, and the coated particles fall into collection container 36.

It is preferable that the axial length of the zone of turbulence is about ten times the diameter of the second chamber. This allows the pressure at the outlet of the flow restrictor to be at a minimum. Particles are fed into second chamber 32 as shown in FIGS. 1 and 2 near the outlet of the flow restrictor, which is preferably positioned at the center line of the hopper. If the pressure at the outlet is too great, the particles will back flow into the hopper.

The pressure of the second gas stream must be sufficient to assist in conveying the coated particles from the zone of turbulence to the collection zone, but should be at lower than the pressure of the first gas stream. This is because a high relative velocity difference between the first gas stream and the second gas stream produces a sufficient degree of turbulence to coat the particles.

Further in accordance with the present invention, there is provided a process for dry coating a food particle with a liquid coating material. The process provides a 1-step process, whereby materials to be coated are fed into the apparatus, coated, and collected without need of separation and/or filtration of the solids from liquids.

It should be noted that the process of the present invention may be practiced using the apparatus illustrated in FIGS. 1, 2 and 3, although it should be understood that the process of the present invention is not limited to the illustrated apparatus. Moreover, it should be noted that while one pass, or cycle, of the process of the present invention substantially or completely coats the particle, more than one pass may be used to adhere additional coating material to the particle, depending on the desired thickness of the coating.

The process comprises the steps of metering a liquid composition into a flow restrictor, such as flow restrictor 14 as shown in FIGS. 1 and 2. As described above for the apparatus, the liquid composition may be a solution, slurry, emulsion or melt.

The process of the present invention further comprises injecting a gas stream, for instance from a gas inlet line such as that shown at 22 in FIGS. 1 and 2, through the flow restrictor concurrently with metering the liquid composition into the flow restrictor, to create a zone of turbulence at the outlet of the flow restrictor. The shear in the zone of turbulence atomizes the liquid composition.

The gas stream is heated prior to injecting it through the flow restrictor. The gas stream may be heated by a heater, such as heater 24 as shown in FIG. 1. As noted above for the apparatus, when the liquid composition is a solution or a slurry, the gas stream is heated to a temperature sufficient to vaporize the liquid of the solution or slurry and to leave the solid of the solution or slurry remaining. When the liquid composition is a melt, the gas stream should be heated to a temperature at or above the melt temperature of the liquid composition, to keep the liquid composition, and in particular, the melt, in liquid (i.e., melt) form. As also noted above for the apparatus, when using a melt, it is also helpful if auxiliary heat is provided to the first inlet line which supplies the melt prior to injection, to prevent pluggage of the line.

The process of the present invention also comprises the step of adding a particle to the zone of turbulence concurrently with the metering of the liquid composition and the injection of the gas stream. This mixes the particle with the atomized liquid composition at the zone of turbulence. This mixing at the zone of turbulence coats the particle with the coating material. The particle is preferably metered in order to control the ratio of the particle and the liquid added at the zone of turbulence. This establishes the level of coating on the particle. When a solution or slurry is used, the heat from the heated gas stream serves to evaporate the liquid of the solution or slurry, leaving the solid of the solution or slurry remaining to coat the particle. The mixing at the zone of turbulence then coats the particle with the remaining solid from the solution or slurry. When a melt is used, the mixing at the zone of turbulence coats the particle with the melt. Particle sizes are generally in the range from 0.5 mm to 20.0 mm.

As noted above, the zone of turbulence is formed by the action of injecting the gas at high pressure through the flow restrictor. As discussed above with respect to the apparatus, it is preferable that the gas stream is accelerated to at least about one-half the velocity of sound prior to injection to ensure that a zone of turbulence of sufficient intensity will be formed at the outlet of the flow restrictor.

The residence time of the particles in the zone of turbulence is determined by the geometry of the first chamber and the amount of gas injected from the gas inlet line. The average residence time of the particle within the zone of turbulence is preferably less than 250 milliseconds. More preferably, the average residence time of the particle within the zone of turbulence is in the range of 25 to 250 milliseconds. Short residence times can be achieved because of the action of the zone of turbulence. The short residence times make the process of the present invention advantageous compared to conventional coating processes because the time, and hence, the cost of coating particles, are reduced. Typically, the particles are fed from a hopper, such as hopper 28 as shown in FIGS. 1 and 2, which is open to the atmosphere. As noted above for the apparatus, when the liquid composition is a melt, it is preferred that the particles be at ambient temperature because this will facilitate solidification of the melt after the melt (which is initially at a higher temperature) coats the particle in the zone of turbulence.

The process of the present invention may further comprise the step of adding another gas stream upstream of the zone of turbulence for cooling and conveying the coated particle. This other gas stream is added through a chamber, such as second chamber 32 as shown in FIGS. 1 and 2. As explained above for the apparatus, the pressure of the second gas stream must be sufficient to assist in conveying the coated particles from the zone of turbulence to the collection container, but should be at lower than the pressure of the first gas stream in order to achieve coating. When a solution or slurry is used, the solid of the solution or slurry cools and solidifies on the particle in the second chamber between the zone of turbulence and a collection container, such as collection zone 36 as described above. When a melt is used, the melt cools and solidifies on the particle in the second chamber between the zone of turbulence and the collection container. When a second chamber is not included, the solid or the melt cools and solidifies on the particle in the atmosphere between the zone of turbulence and the collection container, and the coated particles fall into the container.

The coating materials are generally liquid in nature, and can be single or multiple chemical compositions. Thus, they may be pure liquids, solutions, suspensions, emulsions, melted polymers, resins, and the like. These materials generally have viscosities in the 1 to 500,000 centipoise range. Coatings which are applied can be hydrophilic, hydrophobic or amphoteric in nature, depending on their chemical composition. When more than one coating is applied, it can be either as another shell adhering to the previous coating, or as individual particles on the surface of the material to be coated. These materials may also be reactive so that they cause the material they are coating to increase in viscosity or change to a solid or semi-solid material. So that the coating formed on the selected material is in the range stated above, the coating material should be capable of being molecularly dispersed, so that the coating can grow from the molecular level.

The apparatus as shown in FIGS. 1, 2, and 3 can be used for a number of processes. One such process is that of coating cereal with flavorings, colorants and the like. In this process, the food particle having a size from 0.5 mm to 20.0 mm enters the apparatus and the material which will be used to coat the food particles is fed into the apparatus through the hopper into the high shear/turbulence zone. The resulting atomized coating material coats the surface of the food particle, as it is pneumatically transported through the apparatus. The temperature of the process is at least 5° C. higher than vapor temperature of the solvent at the process operating pressure, so that the volatile materials in the coating mixture (e.g., water) are vaporized within a matter of milliseconds. The coated cereal is then transported out of the apparatus in a substantially dry state, such that there is substantially no net moisture gain from one end of the process to the other. The net moisture gain is measured by a Cenco moisture balance operated at 105° C. Thus, the coating and drying of the material is accomplished in a single step. This is important so that the quality of the food particle is maintained, as the particles are uniformly coated, the material is not degraded by excessive exposure to relatively high temperatures, and the particles do not agglomerate or stick to the sides of the vessels. Furthermore, the moisture level of the coated food particle is substantially the same as the moisture level of the uncoated food particle.

A convective drying process is used for removing residual volatiles that result from putting a solution, slurry or emulsion coating onto the surface of a food particle. Generally, the particle size of the coated solids exits the process as a dry and disperse product with the same particle size as the substrate plus coating thickness. The design of the process precludes wet particles from reaching any wall to which they may stick, which improves the cleanliness of the system, and may also include a recycle system which can reduce any interparticle or particle-to-wall sticking that might otherwise occur. This process may be selected from any number of methods, including but not limited to flash drying, pneumatic conveyor drying and spray drying, or combinations thereof. Residence times for drying are generally less than a minute, and preferably in the millisecond time frame.

As shown in FIG. 3, the apparatus of FIGS. 1 and 2 can have an alternate configuration. Solids enter the apparatus through hopper 43. Liquid is added via a liquid inlet tube 42 located at the top of the apparatus, so that the liquid exits into the high shear/turbulence zone. Hot gas enters chamber 44 through nozzle 41. Product outlet from chamber 44 exits to collector 40. This configuration can allow for faster changes of liquid used for coating, and is less expensive to maintain.

An additional process using the apparatus described above achieves encapsulation of frozen liquid particles with an encapsulating material which is solid or semi-solid in its final state, whereby the frozen particles develop liquid cores by the exchange of sensible heat between the liquid surface as it solidifies and the inner core as it melts. These solid particles are metered into a process device in which a liquid phase (either a melt, solution, or slurry) is used to encapsulate the solid particles. The encapsulating mechanism is achieved via atomization of the liquid phase and mixing under high shear gas phase contacting so that the liquid tends to encapsulate the frozen solid particles rather than the particles agglomerate around the liquid droplet. Simultaneously, the solid frozen core particle returns to the liquid phase through the exchange of sensible heat with the coating material. Encapsulating materials useful to encapsulate frozen particles for this aspect of the invention include, for example, all the coating materials described above. Materials used to comprise the frozen particle to be encapsulated may be any liquid, aqueous solution or nonaqueous solution or a pure material such as a pure liquid or an emulsion or a slurry which can be prepared in solid particulate form and delivered to the process of the invention as a solid feed for encapsulation by the liquid feed coating material. It will be apparent to those skilled in the art that suitable materials for encapsulating will be selected so as to encase the particle under conditions when the particle is in a liquid form and the coating remains distinct from the liquid it encases. For example, molten wax may be selected to encapsulate frozen aqueous particles; or a concentrated sugar solution may be used to encapsulate oil particles. Further, it will also be apparent to those skilled in the art that the coating material selected to encapsulate the particle must be formulated to be of sufficient thickness and structural integrity to contain the particle material in its liquid form. The flexibility of the process of the invention will enable an operator to select conditions suitable to achieve coatings of sufficient thickness so as to accomplish successful particle encapsulation.

Encapsulated particles of the invention will have many utilities across several industries, but particularly within the food, nutrition and health sectors. For example, encapsulation may be employed to improve or maintain the nutritional content of liquid substances; prevent flavor loss by preventing moisture contamination or oxidation; prevent the absorption of off-flavours into the encapsulated liquids, and extend shelf-life and stability.

Further, encapsulation of liquid food, nutrition and health liquid products into particle form greatly facilitates ease of storage, measurement and delivery of these materials. Processing or powdered liquids can be convenient. Packaged dry products will have a lower water activity than products containing the same water content, but in a free or non-encapsulated stated. The encapsulated frozen liquid particles will have greater shelf life, improved flowability and less risk or spoilage due microbial proliferation.

Food and Frozen Particle Preparation

Suitable food particles used in the processes herein are made from various cereal materials. Preparation of an oat containing food particle is described in U.S. Pat. No. 5,198, 255. As described therein, oat groats are cooked and formed into dough. The dough is then formed into shaped pellets, sometimes using an extruder and dried and tempered. Pellets having a moisture content of about 10% may be fed to a gun puffer and puffed to form cereal pieces suitable for further coating. Preferred cereal pieces have an O configuration or doughnut configuration. Other cereal grains such as wheat, rice, corn, barley and mixtures thereof can be formed into particles in a similar way. For the frozen liquid particle encapsulation aspect of the invention, any liquid which can be particulated by any means, and many such means are well known in the art, such as atomization and flash freezing, will be suitable to practice the process of the invention.

EXAMPLES

The following chemicals and reagents were used. Other materials, unless otherwise specified, were received from Aldrich Chemical Co., Milwaukee, Wis.

| | |
|---|---|
| FXPH0294 | Soy nuggets supplied by DuPont Protein Technologies, St. Louis, MO |
| Sucrose syrup | Solution of food grade sucrose dissolved in neutral water to a desired concentration. All concentrations are given as w/w. |
| PUFA | Polyunsaturated fatty acid (PUFA) fish oils, supplied by Omega Protein, Inc., Houston, TX, and also by Ocean Nutrition Canada, Ltd. |

Analytical Tests for Examples

Coating levels were determined based on upon mass balance. Residual moisture analysis was determined using a Cenco moisture balance (Fairfax Va., USA) with resolution to 0.1% moisture.

EXAMPLES

Example 1

Coated Cereal

A cereal with a "doughnut" morphology and a diameter of about 15 mm was coated with a sugar solution to produce a sugar coated cereal in a single coating and drying process. The apparatus as shown in FIG. 1 utilized a nozzle with a ¼ inch center tube and a nozzle throat of 0.36 inches diameter. The conveying body was 1.25 inches in internal diameter with a length of 14 inches. The cereal containing 2% residual moisture was metered to the system at 688 grams/minute using a vibratory type feeder (Syntron). A sugar solution at 116° C. with a concentration of 86% sugar in water was metered at 200 g/min. to the center tube using a peristaltic metering pump. Air at 300° C. and 15 psig was supplied to the nozzle. The air was used to atomize the sugar solution, produce a negative pressure in the mixing zone to induce the addition of the dry cereal, and provide the heat for evaporating the residual moisture from the sugar solution. The product of the mixing/drying was collected in a polyester twill bag filter immediately downstream of the 14 inch conveying tube. The product had a sugar coating equal to 20% of the final mass of the coated particle. The residual moisture was measured (Cenco balance) and was found to be 2%—equivalent to the moisture of the cereal as fed to the process. The "doughnut" morphology was maintained with individual coated particles collected in the bag filter.

Example 2

PUFA Loaded Soy Nuggets Coated with Sucrose

A coating apparatus as in FIG. 1 comprising a 1¼ inch by 12 inch coating body with a 0.369 inch diameter nozzle and a 0.25 inch O.D. liquid feed tube was operated at an air pressure of 40 psig using air at 20 C. The discharge of this apparatus went into a filter bag collector to separate the coated material from the air. A Syntron vibrating feeder was used to meter the FXPH-0294 soy nuggets with general elongated shape of approximately 1.5 mm×3 mm at a rate of 1.2 kg/min. Polyunsaturated fish oil (PUFA) was metered to the system at 539 g/min using a peristaltic pump. The coated soy nuggets were collected with a 31% loading of PUFA, based on mass balance. They had the visual appearance of un-coated soy nuggets.

The PUFA coated soy nugget particles described above were further processed to put a layer of sucrose on the external surface of the PUFA-loaded soy nugget. The apparatus as described above was used at 40 psig using heated air at 270° C. as the mixing gas. The PUFA coated soy nuggets were metered to the process at 536 g/min using the Syntron feeder. A solution of 86% sucrose dissolved in water at a temperature of 116° C. was prepared using a mantle heater on a stainless steel 2 L beaker. This solution was metered at 250 g/min to the process. It coated the exterior of the PUFA/soy nugget particles, which were collected as a dry, free flowing, dispersed particles in a bag filter. The gas phase entering the bag filter had a temperature of 130° C. A mass balance analysis of this product showed that 28.6% of the total composition was sucrose, 22.1% was PUFA, and 49.3% was soy nugget and there was no net change in moisture from that of the original soy nugget, i.e., all residual water from the sucrose solution was evaporated.

Example 3

Puffed Rice Cereal Coated with Sucrose

This experiment concerns coating a puffed rice cereal with a sugar solution, and recovering a dry sugar-coated cereal with no net moisture gain.

The apparatus shown in FIG. 1 was used with a 0.36 inch diameter nozzle throat and a ¼ inch O.D. stainless steel liquid inlet line and was operated using air at 32 psig and 154° C. The cereal (Food Lion's "Crispy Rice" brand puffed rice) was metered using a Syntron vibrating feeder at a rate of 458 g/minute. A 60% (w/w) aqueous solution of sucrose at ambient temperature was metered at 180 g/min (72 g/min water and 108 g/min sugar) through the liquid center tube using a peristaltic metering pump. The product of the mixing was collected in a polyester twill filter bag.

A Cenco brand moisture balance was used to measure the total water in the cereal before and after coating. The initial moisture of the uncoated cereal was 2.1%. The moisture level was 2.0% after coating, thus, showing that all the moisture added with the sugar solution was removed.

The process of the invention was used to coat a puffed rice cereal with a sugar solution to produce a coated puffed rice cereal that is 19.1% sugar (based upon total weight of product) without adding any moisture to the cereal.

Example 4

Encapsulated Liquid Droplet

A flash freeze atomizer is used to produce frozen water particle solids with a mean particle size of 10 micrometers. These frozen solids are metered to the apparatus of FIG. 1 at a rate of 600 grams/minute. A paraffin wax with a melt temperature of 47° C. is metered at 100 g/min at 60° C. to the liquid feed tube of the apparatus. Air at 25° C. is used to atomize the wax, induct the frozen particles, and provide the shear to uniformly coat the wax onto the frozen liquid particles. The exchange of heat among the air, wax, and frozen liquid results in a solid wax particle with a liquid water core which maintains essentially a 10 micrometer mean particle diameter.

What is claimed is:

1. A process for dry coating a food particle, having a size in the range from 0.5 mm to 20.0 mm, with a liquid coating material, the process comprising the steps of:

(a) metering a liquid coating material into a flow restrictor;

(b) injecting a gas stream through the flow restrictor concurrently with step (a) to create a zone of turbulence at the outlet of the flow restrictor, thereby atomizing the liquid coating material, wherein the gas stream is optionally heated; and (c) adding a food particle to the zone of turbulence concurrently with steps (a) and (b) to mix the food particle with the atomized liquid coating material, wherein the mixing at the zone of turbulence coats the food particle with the liquid coating material wherein the moisture level of the coated food particle is substantially the same as the moisture level of the uncoated food particle.

2. The process of claim 1 wherein the food particle is selected from the group consisting of a cereal food product, a snack food product, a baked good product, an extruded food product, a fried food product, a health food product, a pet food product, or animal feed.

3. The process of claim 1 wherein the liquid coating material comprises a sweetening agent, a food flavoring agent or enhancer, a food color, a food aroma agent, an anti-caking agent, an humectant, an antimicrobial agent, an antioxidant, a surface modifying agent, a nutritional supplementing agent, a carbohydrate, a protein, a lipid or a mineral.

4. The process of claim 1 further comprising repeating steps (a)–(c) at least once wherein the liquid coating material is the same or different.

5. A process for encapsulating a frozen liquid particle, having a size in the range from 5 micrometers to 5 millimeters with a liquid coating material, the process comprising the steps of:

(a) metering a liquid encapsulating material into a flow restrictor;

(b) injecting a gas stream through the flow restrictor concurrently with step (a) to create a zone of turbulence at the outlet of the flow restrictor, thereby atomizing the liquid encapsulating material, wherein the gas stream is optionally heated; and (c) adding a frozen liquid particle to the zone of turbulence concurrently with steps (a) and (b) to mix the frozen liquid particle with the atomized liquid encapsulating material, wherein the mixing at the zone of turbulence encapsulates the frozen liquid particle.

6. The process of claim 5 wherein the frozen liquid particle comprises an aqueous solution.

7. The process of claim 5 wherein the frozen liquid particle comprises a non-aqueous solution.

8. The process of claim 5 wherein the frozen liquid particle comprises a pure material, a slurry or an emulsion.

9. The process of claim 5 wherein the liquid encapsulating material comprises a sweetening agent, a food flavoring agent or enhancer, a food color, a food aroma agent, an anti-caking agent, an humectant, an antimicrobial agent, an antioxidant, a surface modifying agent, a moisture barrier, a shelf-life extending agent, a flavor retaining agent, a nutritional supplementing agent, a carbohydrate, a protein, a lipid or a mineral.

10. The process of claim 5 further comprising repeating steps (a)–(c) at least once wherein the liquid coating material is the same or different.

* * * * *